United States Patent
Chui et al.

(10) Patent No.: US 10,268,705 B2
(45) Date of Patent: Apr. 23, 2019

(54) IDENTIFYING UNUSED PRIVILEGES IN A DATABASE SYSTEM

(71) Applicant: Oracle International Corporation, Redwood Shores, CA (US)

(72) Inventors: Chi Ching Chui, San Ramon, CA (US); Vikram R. Pesati, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 473 days.

(21) Appl. No.: 14/313,254

(22) Filed: Jun. 24, 2014

(65) Prior Publication Data

US 2015/0370824 A1   Dec. 24, 2015

(51) Int. Cl.
    *G06F 17/30* (2006.01)
(52) U.S. Cl.
    CPC ............... *G06F 17/30289* (2013.01)
(58) Field of Classification Search
    CPC ............ G06F 11/201; G06F 21/577; G06F 2221/2145; G06F 17/30873; G06F 17/30893; G06F 17/30958; G06F 21/121; G06F 9/468
    See application file for complete search history.

(56) References Cited

U.S. PATENT DOCUMENTS

| | | | | |
|---|---|---|---|---|
| 6,023,765 A * | 2/2000 | Kuhn | ............... | G06F 21/6218 713/166 |
| 7,277,864 B2 * | 10/2007 | Ohnennus | .......... | G06Q 30/0201 705/7.29 |
| 8,073,731 B1 * | 12/2011 | Rajasenan | .......... | G06Q 10/0637 705/7.38 |
| 8,201,191 B2 * | 6/2012 | Ladd | ............... | H04L 63/10 709/229 |
| 8,281,371 B1 * | 10/2012 | Chickering | .......... | G06F 21/577 709/219 |
| 2002/0124082 A1 * | 9/2002 | San Andres | .......... | G06F 11/201 709/225 |
| 2004/0225893 A1 * | 11/2004 | Ng | ............... | G06F 21/10 726/27 |
| 2004/0238645 A1 * | 12/2004 | Abelian Sevilla | .. | G06F 21/6218 235/492 |
| 2005/0027981 A1 * | 2/2005 | Baum-Waidner | ..... | H04L 63/102 713/164 |
| 2005/0138413 A1 * | 6/2005 | Lippmann | ............. | G06F 21/577 726/4 |
| 2005/0262487 A1 * | 11/2005 | Pistoia | ............... | G06F 9/468 717/143 |

(Continued)

*Primary Examiner* — Angelica Ruiz
(74) *Attorney, Agent, or Firm* — Hickman Palermo Becker Bingham LLP; Daniel D. Ledesma

(57) ABSTRACT

Techniques for identifying unused privileges are provided. Database accesses are monitored to generate privilege usage data. Privilege usage data for each database access may indicate a user, a utilized privilege, an object that is the target of the privilege, and a role to which the privilege is granted. The privilege usage data is compared to database authorization data that indicates all (or a subset) of granted privileges. A result of the comparison is unused privilege data that indicates what granted privileges were not utilized. A role graph may be generated that indicates one or more privileges that were utilized and one or more privileges that were not utilized along with role paths providing the privileges.

22 Claims, 3 Drawing Sheets

(56) References Cited

U.S. PATENT DOCUMENTS

| | | | | |
|---|---|---|---|---|
| 2007/0067334 | A1* | 3/2007 | Durbin | G06F 21/6227 |
| 2009/0077045 | A1* | 3/2009 | Kirchmeier | G06Q 10/06 |
| 2009/0077666 | A1* | 3/2009 | Chen | G06F 21/577 |
| | | | | 726/25 |
| 2009/0187440 | A1* | 7/2009 | Sreevas | G06Q 10/00 |
| | | | | 705/75 |
| 2009/0254392 | A1* | 10/2009 | Zander | G06F 21/6218 |
| | | | | 705/50 |
| 2009/0300019 | A1* | 12/2009 | Itkin | G06F 21/6227 |
| 2010/0235748 | A1* | 9/2010 | Johnson | G06Q 30/00 |
| | | | | 715/730 |
| 2010/0241644 | A1* | 9/2010 | Jackson | G06F 17/30392 |
| | | | | 707/760 |
| 2011/0208700 | A1* | 8/2011 | Noble | G06F 17/30309 |
| | | | | 707/638 |
| 2011/0302397 | A1* | 12/2011 | Mitola, III | G06F 9/524 |
| | | | | 712/241 |
| 2014/0136346 | A1* | 5/2014 | Teso | G06Q 30/06 |
| | | | | 705/14.72 |

* cited by examiner

US 10,268,705 B2

IDENTIFYING UNUSED PRIVILEGES IN A DATABASE SYSTEM

FIELD OF THE DISCLOSURE

The present disclosure relates to tracking utilized privileges in a database system and identifying which granted privileges are unused.

BACKGROUND

In database management systems, data access is typically controlled by a privilege-based mechanism. Privileges can be granted on a system level or an object level. Privileges can also be granted to database roles within a role hierarchy. Thousands of privilege and role grants are normal in today's complex applications. Applications usually do not follow a least privileged model where users or roles are assigned the least privilege scope as possible. In other words, under a least privilege model, a privilege is not assigned to a user or role that does not need the privilege. Instead, applications developers mainly focus on functionality of their respective applications and usually do not invest time to identify minimum privileges required to complete the functionality.

Many (if not most) users of applications have excessive privileges that can be used to access sensitive data belonging to other applications. This becomes a significant problem in a multi-tenant environment. One tenant might be able to use its excessive privileges to view data in other tenants.

This excessive privilege problem also extends to database administration. Some database administrators have been granted powerful system-level privileges. Much of the time these powerful privileges are not required for normal daily maintenance work. Such excessive privilege grants can be used to access restricted corporate data. Currently, traditional database auditing tools are used to monitor activities carried by over-privileged users. However, not all customers turn on auditing on all actions. Also, database auditing involves creating a record for every single action initiated by each user. Thus, auditing tools generate a large amount of audit data and causes performance issues. Furthermore, audit data indicates what has been done. Audit data does not provide information on used or unused privileges for users and applications.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for identifying unused (or under-utilized) privileges in a database system. Database access is monitored and privilege usage data is identified, where utilized privileges, accessed objects, and roles are tracked. Privilege usage data is compared with database authorization data that indicates (for example, all possible) privileges that are granted to roles or directly to users. A result of the comparison is a set of privileges that are unused. The set of unused privileges are considered excessive privileges.

One technique described herein involves generating a role graph that includes multiple grant paths, where each grant path connects a granted privilege to one or more users through zero or more roles. The role graph may show over-privileged users/roles that have been a granted privilege through one or more grant paths.

Privilege Reduction Mechanism

Figure 1:
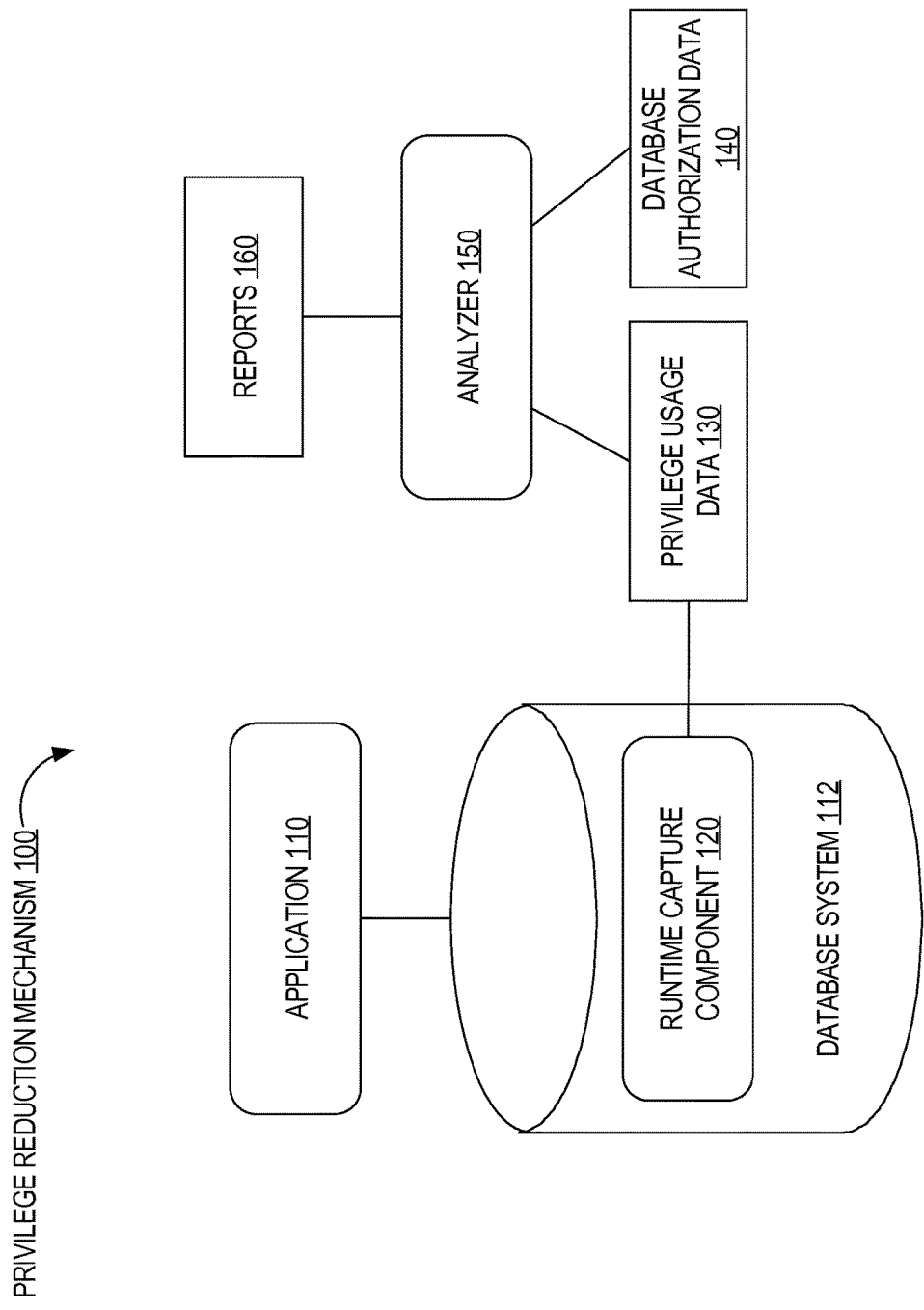
FIG. 1 is a high level block diagram of a privilege reduction mechanism, in an embodiment.

FIG. 1 is a high level block diagram of a privilege reduction mechanism (PRM) 100, in an embodiment. PRM 100 includes an application 110, a runtime capture component 120, privilege usage data 130, database authorization data 140, analyzer 150, and reports 160. Each of runtime capture component 120 and analyzer 150 may be implemented in software, hardware, or a combination of software and hardware.

Application 110 represents a single application or multiple applications that submit data requests to a database system. Example data requests include SQL queries and/or PL/SQL calls. Application 110 may be a deployed or non-deployed application. In other words, the data requests from application 110 may be initiated by actual end users of application 110 in a production environment or may be initiated by one or more testers of application 110 before application 110 is deployed for end-user use. Thus, the application data requests may represent an actual workload or an artificial workload. Even if the workload is an actual workload, the capturing of privilege usage may be based on replaying a previously recorded (or captured) workload.

Runtime Capture Component

Runtime capture component 120 generates privilege usage data 130, which includes, for each database access, information about one or more of privileges used as part of the database access, accessed objects, user granted access to those objects, and role(s) that user had at the time of access. Example privileges include select, insert, delete, and update, each of which typically pertains to data values that are stored within a table, index, view, or other database object. However, such privileges may be associated with operations associated with metadata of database objects, such as adding or deleting columns, updating the data type of a column, creating a table or index, and dropping a table or index.

Privileges may be object-level privileges, schema-level privileges, or system-level privileges. Example system-level privileges include selecting any table in a database, updating any table in the database, and deleting any table in the database. An example schema-level privilege is selecting any table that belongs to a particular schema or dropping any table that belongs to the particular schema.

In an embodiment, privilege usage data that is stored in response to a privileged database access indicates not only the type of privilege utilized (e.g., select, update), but also whether the utilized privilege was a system-level privilege, a schema-level privilege, or an object-level privilege. Thus, while a user may access an object through an object-level privilege, the user may be associated with a role that grants the user a system-level privilege with respect to that object, when the user does not need (or never has requested) that system-level privilege. In other words, the user is over-privileged, at least with respect to that object.

Privilege usage information about a single database access may be stored in a single "capture" record. Thus, privilege usage data 130 may comprise multiple capture records. Processing a single application data request (e.g., a SQL query) may result in multiple database accesses. Thus, a single application data request may result in multiple capture records.

An object associated with a privilege may be a table, a view, a column, a row, a set of rows, metadata of one of the foregoing, or a combination of the above, such as a table and two views. For example, an object indicated in a capture record may be identified by a predicate that defines a portion of another object, such as "c<3 on T," which indicates all rows whose value in column c of table T is less than 3.

Database Authorization Engine

In an embodiment, runtime capture component 120 is implemented in a database authorization engine to capture privilege usage data 130 during runtime. The database authorization engine may be part of a query engine that processes queries or database statements, generates execution plans, and executes the execution plans. The database authorization engine is configured to determine whether a requested privilege is allowed to be used. For example, if a user U with role R submits a request to application A, which generates a query Q to select rows, of a table T, that satisfy one or more predicates, then the database authorization engine determines whether user U and/or application A is allowed to access (or view) those rows. If so, then runtime capture component 120 creates and stores a record that indicates two or more of user U, application A, role R, privilege select, and table T. Thus, runtime capture component 120 may be triggered to create the record only if the database authorization engine determines that the query may be executed. The database authorization engine may be the entity that triggers (i.e., configured to call or initiate) runtime capture component 120 to generate capture records.

Initially, capture records may be stored in volatile memory and later moved to non-volatile or persistent storage, such as a disk. The timing of when capture records are moved to non-volatile storage may vary, such as every ten minutes, when the capturing is complete, or when the size of available volatile memory is below a threshold.

Cursors

Capture records may be reflected in one or more cursors, each of which is a data structure that store results of preliminary work performed during compilation of a query. Example preliminary work may include parsing, semantic analysis, query rewriting, and query plan generation. One set of information stored in a cursor includes the execution plan for performing the operations specified by the corresponding query during query execution.

In one embodiment, when a database server receives a query submitted by a particular principal (e.g., a user or a defined group of users), the database server performs a cursor sharing check in order to determine whether the principal submitting the query may use an existing cursor. For example, a principal that subsequently resubmits a query that has been previously rewritten may reuse a cursor saved for the rewritten query, assuming that the principal's access privileges have not changed. Reuse of a saved cursor allows the database server to execute the query without re-performing all of the compilation steps already processed for the query. In addition to reusing a cursor for the same principal subsequently submitting a query, in another embodiment, a principal with the same privileges as another principal that has a saved cursor may reuse the same cursor.

In order to reuse previously saved database cursors, a database server receiving a query that identifies a database table associated with a data access control policy first determines the privileges associated with the requesting principal based on the data access control policy. After determining the privileges associated with the requesting principal, the requesting principal's privileges are compared to existing cursors in order to determine whether the principal may reuse a saved cursor. If a saved cursor exists for the requesting principal or a principal with the same privileges as the requesting principal, then the database server may use the saved cursor to execute the query instead of recompiling the query.

In an embodiment, privilege usage data 130 is stored (e.g., at least initially) in one or more cursors or is based on cursor data that is stored in one or more cursors. Thus, a cursor may include cursor data that identifies the application that submitted the query for which the cursor was generated, the user (or user group) that initiated the submission of query by the application, one or more objects that the query targets, one or more privileges that were used to access the one or more objects, one or more roles to which the one or more privileges were granted, and/or a schema to which the one or more objects belong. The cursor data may also indicate when (e.g., date and/or time) the cursor was first used to execute a query, how many times the cursor was used to execute queries, and/or the last time the cursor was used to execute a query.

In an embodiment, a cursor stores one or more capture records that reflect a portion of privilege usage data 130. Alternatively, privilege usage data 130 is stored separate from cursors upon which privilege usage data 130 is based. If stored separate, privilege usage data 130 may store, for each capture record, cursor identification data that identifies upon which cursor that capture record is based.

Because a cursor may be shared by multiple queries submitted by one or more applications associated by one or more users, the privilege usage data associated with that cursor may also indicate multiple applications and multiple users. For example, a first capture record associated with (or stored in) a cursor may indicate, for a first database access using that cursor, user U1, application A, role R, privilege select, schema S, and object O. A second capture record associated with (or stored in) that cursor may indicate, for a second database access using that cursor, user U2, application A, role R, privilege P, schema S, and object O. Each capture record may further indicate the date or time when the corresponding database access was made (or when the capture record was created).

When it is determined that a cursor may be shared, then runtime capture component 120 may determine that another capture record does not need to be created. Instead, only upon the generation of a new cursor is a capture record created.

Alternatively, runtime capture component 120 may examine one or two data items to determine whether to create another capture record or update an existing one. For example, it may be assumed that since a cursor is being shared, the one or more objects (i.e., associated with the cursor and the current query) will be the same, the schema will be the same, and the privileges will be the same. The application associated with the cursor and the current query may also be the same. Thus, runtime capture component 120 may only identify the user (and, optionally, the application) that is associated with the cursor and with the current query. If the user is different, then runtime capture component 120 may update the privilege usage data associated with the cursor to indicate the user that is associated with the current query (e.g., by creating a new capture record or updating an existing capture record). If the user is the same, then runtime capture component 120 might not perform any additional work with respect to the current query. Alternatively, runtime capture component 120 may update the privilege usage data associated with the cursor to indicate (a) a timestamp associated with the current query and/or (b) a count that indicates a number of times this particular type of database access was made.

In an embodiment, runtime capture component 120 is not part of runtime reduction mechanism 100. Instead, it may be assumed that all privilege usage data is already stored in cursors and, thus, analyzer 150 analyzes existing cursors for different privilege usage data and aggregates the different privilege usage data.

While auditing tools may mine millions of records to identify illegal access, current auditing tools solutions do not have the capability to identify which privileges are excessive. Instead, they only monitor unauthorized activities in the database and cannot prevent future usage.

Unique Privilege Usage Data

If a different capture record is created for each database access, then the storage required to maintain the resulting capture records may be significant. Thus, in an embodiment, runtime capture component 120 only captures unique privilege usage data. In other words, if multiple database accesses were made by user U under role R involved privilege P on object O, then a single capture record is created and represents the multiple database accesses. Thus, if user U under role R later utilized privilege P again on object O, then another capture record is not created. Therefore, a single capture record may represent hundreds or thousands of database accesses.

However, if user U later utilized privilege P on object O while having a different role (e.g., R2), then a record of that database access may be created if role level information is being tracked. Also, if user U under role R later utilized a different privilege (e.g., P2) on object O, then a capture record for that access may also be created.

In an embodiment, even though a capture record may be unique relative to other capture records, the capture record may include a count that indicates a number of times the corresponding database access was made.

Example Privilege Usage Data

The following is a table that reflects example privilege usage data:

TABLE A

| User | Privilege | Role | Schema | Object | Path |
|---|---|---|---|---|---|
| User1 | Select | R3 | HR | EMP | User1 ← R3 |
| User1 | Insert | R5 | HR | EMP | User1 ← R2 ← R5 |
| User2 | Insert | R5 | HR | EMP | User2 ← R5 |

Table A includes information about three different capture records. The capture records may be associated with different cursors. For example, the first row in Table A corresponds to a first capture record that is associated with a first cursor, the second row in Table A corresponds to a second capture record that is associated with a second cursor, and the third row in Table A corresponds to a third capture record that is associated with a third cursor. As another example, the first row corresponds to a first capture record that is associated with one cursor, and the second and third rows correspond to one or two capture records that are associated with another (single) cursor.

Grant Path

Table A also includes grant path data. For each utilized privilege indicated in Table A, a graph path is included that indicates how a user is granted the privilege. A "grant path" indicates how a user (or other requesting entity) is granted a privilege through zero or more roles. For example, user User1 is granted the insert privilege on the EMP table through roles R2 and R5. In other words, the insert privilege on the EMP table is granted to role R5, which is granted to role R2, which is assigned to user User1. Thus, a user may be granted a privilege through one or more roles. Also, a user may also be granted a privilege directly, i.e., without any intervening roles. Additionally, a user may be granted the same privilege through different grant paths.

Capture Profiles

In an embodiment, a user (or "security officer") creates one or more capture profiles, each of which defines the scope of privilege usage that will be captured by runtime capture component 120. A capture profile may indicate an attribute value for one or more capture attributes, such as user, application, schema, session, privilege, objects, and roles. Thus, a capture profile may specify which users to track, which applications to track, which schemas to track, which sessions to track, which privileges to track, which objects to track, and/or which roles to track.

If a capture attribute of a particular database access has an associated value, then when that value is discovered by the runtime capture component 120, runtime capture component will store information about the details of the particular database access. For example, if a capture profile indicates that table T is to be tracked and T is subsequently accessed, then runtime capture component 120 will store privilege usage data about that access.

A value of a capture attribute may indicate that all values associated with that capture attribute are captured. For example, all values associated with a particular capture attribute are tracked if a value of that particular capture attribute is null, zero, or not specified.

For example, a capture profile may indicate that all used privileges in the entire database are to be tracked, regardless of application, user, session, etc. In this example, the capture profile may not have any value for any of the capture attributes.

As another example, a capture profile may indicate that all used privileges with respect to a particular schema are to be tracked, where a schema is a namespace to which database objects belong. In this example, only the schema capture attribute may have a value specified.

As another example, a capture profile may indicate that all used privileges with respect to a particular role are to be tracked, regardless of application, schema, object, etc. As another example, a capture profile may indicate that only delete privileges are to be tracked, regardless of application, schema, object, etc.

Each capture profile may be associated with an enable attribute whose value indicates whether the capture profile is enabled. A capture profile is enabled if the database system is capturing used privileges as specified in the capture profile. A capture profile is disabled if the database system is not capturing privilege usage as specified in the capture profile. Thus, a set of capture profiles may include one or more enabled capture profiles and one or more disabled capture profiles.

A capture profile may indicate one or more completion criteria that indicates when capturing for the capture profile should cease or, in other words, when the capture profile should be automatically disabled. Example completion criteria include a specific time, a number of captures records that have been created for the capture profile or for multiple capture profiles, or size of available volatile memory for storing the capture records. Runtime capture component 120 may periodically check to determine whether the one or more completion criteria are satisfied. An enabled capture profile may also become disabled manually based on input from, for example, the security officer or administrator of the database system.

Conversely, a capture profile may indicate one or more starting criteria that indicates when capturing for the capture profile should start, or in other words, when the capture profile should be enabled. Example starting criteria include a specific time or the occurrence of a particular event. A disabled capture profile may also become enabled manually based on input from, for example, the security officer or administrator of the database system.

In an embodiment, a capture record stores profile identification data that identifies the capture profile that was used to generate the capture record. If a capture record is associated with multiple capture profiles, then the profile identification data of that capture record identifies each of the multiple capture profiles.

In an embodiment, if multiple capture profiles are enabled, then capture records that are created based on those capture profiles are stored separately. For example, capture records that are created based on capture profile A are stored in one table while capture records that are created based on capture profile B are stored in another table. Alternatively, the capture records are stored in the same table and may be identified, in the table, using an identifier for the respective capture profile.

Database Authorization Data

Database authorization data 140 is data that indicates privileges that are granted to roles, users, groups, or applications, regardless of whether those privileges have been utilized during a capture period. Thus, database authorization data 140 does not change during a capture period, unless a privilege has been added, deleted, or updated.

The format in which database authorization data 140 is stored may vary from one implementation to another. For example, database authorization data 140 may comprise multiple authorization records that are similar to capture records. As another example, database authorization data 140 may be a two column table that indicates, for each row, a relationship between (a) a user/group/application and a role, (b) a role and another role, or (c) a role and a privilege. For example, a row of type (a) may indicate user U and role R1, which means that the privileges granted to (or assumed by) role R1 are granted to user U. A single user, group, or application may be associated with multiple roles. A row of type (b) may indicate role R2 and role R3, which means that the privileges granted to role R3 are also granted to role R2. A row of type (c) may indicate role R4 and privilege P3, which is an object-level select on object O. This means that privilege P3 is granted to role R4. Another row of type (c) may indicate R4 and privilege P4, which is a system-level update on object O. A single privilege may be granted to multiple roles. Similarly, multiple privileges may be granted to a single role.

Analyzer

Analyzer 150 is configured to compare privilege usage data 130 with database authorization data 140 to generate unused privilege data that is reflected in reports 160. A user, such as a security officer, may use reports 160 to decide what unused (or excessive) privilege grants to remove.

Privilege usage data 130 may be considered a subset of database authorization data 140 while unused privilege data is considered a different subset of database authorization data 140. Thus, unused privilege data may be viewed as a difference between database authorization data 140 and privilege usage data 130.

If privilege usage data 130 is limited to certain requesting entities, certain roles, certain objects, or certain privileges, then the comparison between privilege usage data 130 and database authorization data 140 may involve only a portion database authorization data 140 that is similarly limited. For example, if privilege usage data 130 is only about User1, then the portion of database authorization data 140 against which privilege usage data 130 is compared may be limited to the granted privileges of User1. As another example, if privilege usage data 130 is only about role R2, then the portion of database authorization data 140 against which privilege usage data 130 is compared may be limited to the granted privileges through role R2.

The following is a table that reflects example unused privilege data that analyzer 150 may generate:

TABLE B

| User | Privilege | Role | Schema | Object | Path |
|---|---|---|---|---|---|
| User1 | delete | | HR | EMP | User1 ← R1 ← R4 |
| User1 | delete | | HR | EMP | User1 ← R2 ← R5 |

Table B includes two rows where each row indicates that user User1 did not access the delete privilege on object EMP. One row of Table B indicates one grant path under which user User1 is granted the (unused) delete privilege on object EMP while the other row of Table B indicates another grant path under which user User1 is granted the (unused) delete privilege on object EMP. Alternatively, these two rows of Table B may be reflected in a single row where the single row indicates both unused grant paths.

In an embodiment, multiple sets of unused privilege data are captured. The multiple sets may be captured for a particular user, user group, or application and correspond to different periods of time. For example, a first set may be captured for a particular user during a first period of time (e.g., one day) and a second set may be captured for the particular user during a second period of time (e.g., another day) that is later than the first period of time. Alternatively, the multiple sets may correspond to the same period of time but are captured for different requesting entities. For example, a first set may be captured for a first user, a second set for a second user, a third set for a particular user group, and a fourth set for a particular application.

The multiple sets of unused privilege data may then be combined or aggregated to produce a single set of unused privilege data.

In an embodiment, reports 160 comprise the unused privilege data that is determined by analyzer 150, such as the unused privilege data in Table B. Additionally, or alternatively, reports 160 includes a visual display of grant paths and which privileges or grant paths were not utilized.

In an embodiment, after an unused privilege with respect to a requesting entity is determined, the unused privilege is audited using a traditional auditing approach to determine whether the requesting entity eventually uses the unused privilege. In this way, premature removal of unused privilege grants may be avoided. Additionally or alternatively, after identifying a first set of unused privileges, another privilege usage report is created and compared against privilege authorization data 140, a second set of unused privileges is determined, and the second set of unused privileges is compared against the first set of unused privileges. Additionally or alternatively, a script is automatically generated, which a security officer can use to revoke unused privileges, such as any unused privileges, any unused privileges by a particular requesting entity, or any unused directly granted privileges. Additionally or alternatively, an identified unused privilege that is subsequently being requested by a requesting entity may be blocked from being utilized at that time.

Role Graph

Figure 2:
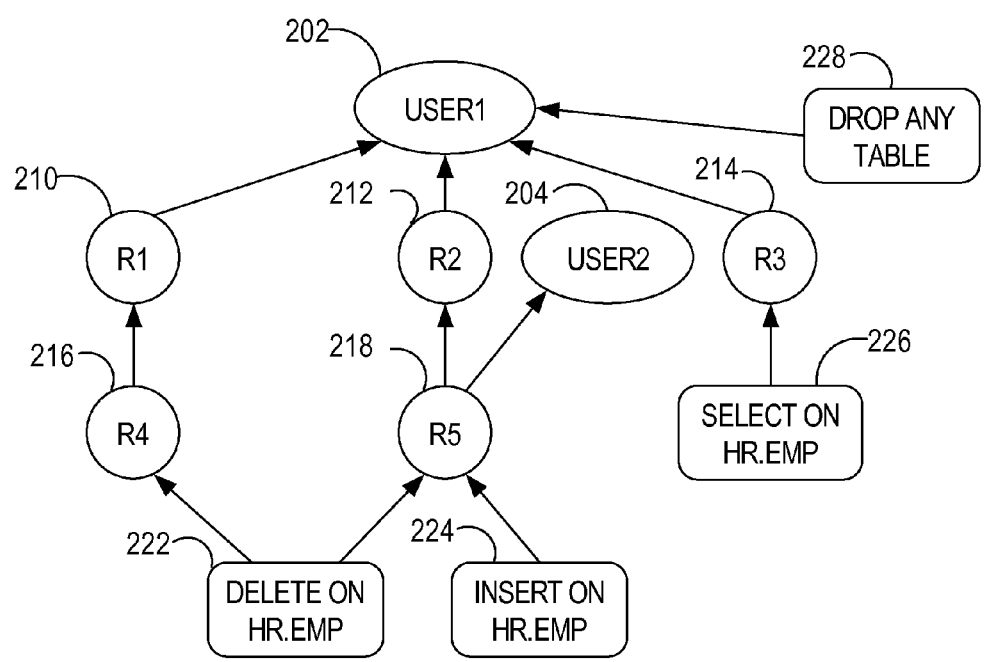
FIG. 2 is a block diagram that depicts an example role graph, in an embodiment.

FIG. 2 is a block diagram that depicts a role graph 200, in an embodiment. Role graph 200 includes information about multiple users. However, role graph 200 may be restricted to include only information about a single user.

Role graph 200 includes multiple nodes, each of which is connected to at least one other node. Each node represents a requesting entity, a role, or a privilege on an object. Nodes 202 and 204 represent User1 and User 2, respectively. Nodes 210-218 represent roles R1-R5, respectively. Nodes 222-228 represent different privileges. Specifically, node 222 represents a delete privilege on table EMP which belongs to schema HR (which stands for "Human Resources"), node 224 represents an insert privilege on table EMP, node 226 represents a select privilege on table EMP, and node 228 represents a drop privilege on any table. Thus, User1 is granted delete privilege 222 through different grant paths: one including roles R1 and R4 and the other including roles R2 and R5.

In an embodiment, role graph nodes that represent unused privileges are visually distinguished from role graph nodes that represent utilized privileges. Examples of how privilege nodes may be visually distinguished from one another include node size, font size, font type, font color, node color, border size, shade of color, and graphics. For example, insert privilege 224 may be highlighted, indicating that insert privilege 224 was utilized. A user (or security officer) viewing role graph 200 with insert privilege 224 highlighted may determine that the assignment of User1 to role R1 is not necessary, since no graph path that involves roles R1 and R4 is used. Continuing with the example, User1 (or another user not depicted) may be granted a privilege through role R1; therefore, deleting role R1 would not be prudent. However, if no other user is using a graph path that involves R1, then R1 is a candidate for deletion.

Similarly to role graph nodes, unused grant paths may be visually distinguished from utilized grant paths. For example, the graph path from User1 to role R1 to role R4 to delete privilege 222 may be highlighted (or, more specifically, the connections between the nodes in the grant path may be highlighted) to indicate that User1 did not utilize delete privilege 222.

Thus, analyzer 150 (or another component) may highlight roles, node connections, and/or privileges that are not utilized by a particular user or by multiple (e.g., all) users. In this way, a user (such as a database administrator) may quickly determine whether any unused roles or unused privileges should be changed or removed.

Role graph 200 may initially represent all (or at least a subset) of the privileges granted to users User1 and User2, regardless of whether those privileges have been utilized. Thus, role graph 200 may only represent database authorization data 140 (or a portion thereof). Role graph 200 may then be updated, based on privilege usage data 130, to indicate which privileges have been utilized (or not) by users User1 and User2.

Decisions on which role assignments (e.g., user to role or role to role) or privilege grants (i.e., role to privilege) to update (e.g., remove or change) based on determined unused privilege data may be made manually or automatically. For example, role graph 200 that visually distinguishes unused privileges from utilized privileges (or unused grant paths from utilized privileges) allows a security officer (or database administrator) to determine which role assignment or privilege grants to update. In this way, no sophisticated software component is required to analyze a role graph to determine which role assignments or privilege grants to update. Also, a database administrator may desire that such automatic updates do not occur without his/her approval. For example, even though a privileged grant is not utilized by a particular user (or other requesting entity) during a period of time, it may be important for that particular user to maintain that privilege, which may be necessary in the future.

Another type of privilege grant update (which may be performed automatically or based on user input) is reorganizing role definitions. For example, in FIG. 2, insert privilege 224 is granted to User1 through one grant path. A database administrator may determine that it would be prudent to grant insert privilege 224 to role R3 instead of to role R5. Afterward, the database administer re-assigns insert privilege 224 to role R5.

A count or number of times a privilege was utilized may be used to visually distinguish that a privilege from other utilized privileges in a role graph. For example, a privilege that was utilized fifty times may have a darker shade of red than another privilege that was utilized just once. Thus, excessively utilized privileges may be distinguished from underutilized privileges.

Similarly, when a privilege was last utilized may be used to visually distinguish that privilege from other utilized privileges in a role graph. For example, a privilege that was utilized in the last five minutes may have a larger border than another privilege that was utilized a day ago. Thus, recently utilized privileges may be distinguished from utilized privileges that have not been utilized for a relatively long period of time.

In an embodiment, a role graph may not show any users or other requesting entities, such as a user group or application. Instead, a role graph may only show roles and their respective granted privileges. Such a role graph may be used to show which roles are not showing up in privilege usage data 130. A security officer may determine that such roles are candidates for removal.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
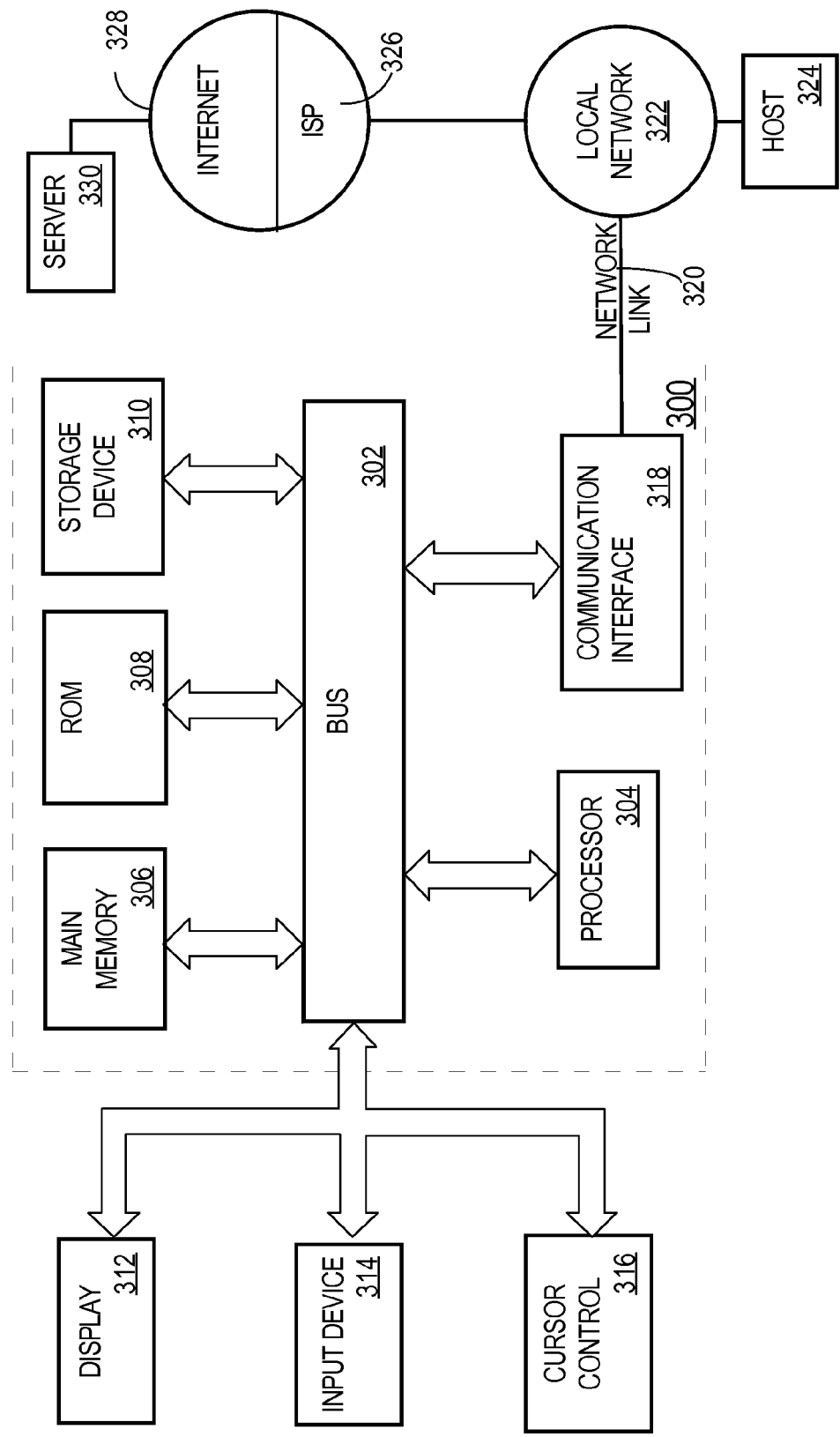
FIG. 3 is a block diagram that illustrates a computer system 300 upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   identifying a set of privileges that are available to a plurality of requesting entities, wherein the set of privileges includes two or more of select, insert, delete, or update;
   monitoring a set of database accesses initiated by the plurality of requesting entities, wherein the set of database accesses include a subset that involve a first subset of the set of privileges, wherein the first subset comprises privileges that have been used by the plurality of requesting entities;
   wherein monitoring comprises:
      determining, by a database authorization engine, based on a query, whether a requesting entity is authorized to utilize a privilege with respect to an object;
      in response to determining, by the database authorization engine, that the requesting entity is authorized to utilize the privilege with respect to the object:
         executing an execution plan for the query, wherein executing involves a database access in the subset of the set of database accesses, and
         creating a particular record about the database access, wherein the particular record identifies the requesting entity, the privilege, the object, and zero or more roles;
   performing a comparison of the set of privileges and the first subset;
   based on the comparison of the set of privileges and the first subset, identifying a second subset, of the set of privileges, that has not been used by any of the plurality of requesting entities;
   wherein the method is performed by one or more computing devices.

2. The method of claim 1, further comprising:
   storing a record for each of multiple database accesses in the subset of the set of database accesses;
   wherein the record identifies a particular requesting entity, a particular privilege, a particular object that was a subject of the corresponding database access, and a role to which the particular privilege is granted.

3. The method of claim 1, further comprising:
   for each privilege in the second subset:
      identifying a particular requesting entity that is associated with said each privilege, and
      identifying one or more roles to which the particular requesting entity is assigned and through which the particular requesting entity is granted said each privilege.

4. The method of claim 1, wherein:
   monitoring comprises storing privilege usage data that indicates the first subset of the set of privileges;
   wherein storing the privilege usage data comprises storing at least a portion of the privilege usage data in a cursor that includes a particular execution plan.

5. The method of claim 4, wherein storing the privilege usage data comprises:
   storing a first portion of the privilege usage data in a first cursor, and
   storing a second portion of the privilege usage data in a second cursor that is different than the first cursor.

6. The method of claim 1, further comprising:
   receiving input that indicates what information to monitor;
   wherein the input identifies one or more of a set of requesting entities, the set of privileges, a set of objects, or a set of roles;
   wherein monitoring comprises monitoring based on the input.

7. The method of claim 1, wherein monitoring comprises:
   determining that a first database access in the set of database accesses is initiated by a particular requesting entity and involves a first privilege;
   creating a first record that includes information about the first database access;
   determining that a second database access in the set of database accesses is initiated by the particular requesting entity and involves the first privilege;
   based on the first record, determining not to create a second record for the second database access.

8. A method comprising:
   determining that a first privilege with respect to a first database object was not utilized by a first requesting entity, wherein the first privilege includes one of select, insert, delete, or update;
   determining a first grant path from the first requesting entity to the first privilege through one or more roles;
   causing data about the first grant path to be displayed;
   causing a role graph to be displayed, wherein the role graph includes:
      a first node that represents a particular requesting entity,
      one or more second nodes, each representing a role assigned directly or indirectly to the particular requesting entity;

one or more third nodes, each representing a privilege that is granted to the particular requesting entity either directly or indirectly through one or second more roles;

wherein the method is performed by one or more computing devices.

9. The method of claim 8, wherein the one or more roles is a plurality of roles that includes a first role to which the first requesting entity is assigned and a second role that is different than the first role and to which is granted the first privilege with respect to the first database object.

10. The method of claim 8, wherein:
the one or more third nodes are a plurality of third nodes.

11. The method of claim 8, wherein the role graph also includes one or more fourth nodes, each representing a requesting entity that is different than the particular requesting entity.

12. One or more non-transitory storage media storing instructions which, when executed by one or more processors, cause:
identifying a set of privileges that are available to a plurality of requesting entities, wherein the set of privileges includes two or more of select, insert, delete, or update;
monitoring a set of database accesses initiated by the plurality of requesting entities, wherein the set of database accesses include a subset that involve a first subset of the set of privileges, wherein the first subset comprises privileges that have been used by the plurality of requesting entities;
wherein monitoring comprises:
determining, by a database authorization engine, based on a query, whether a requesting entity is authorized to utilize a privilege with respect to an object;
in response to determining, by the database authorization engine, that the requesting entity is authorized to utilize the privilege with respect to the object:
executing an execution plan for the query, wherein executing involves a database access in the subset of the set of database accesses, and
creating a particular record about the database access, wherein the particular record identifies the requesting entity, the privilege, the object, and zero or more roles;
performing a comparison of the set of privileges and the first subset;
based on the comparison of the set of privileges and the first subset, identifying a second subset, of the set of privileges, that has not been used by any of the one or more requesting entities.

13. The one or more storage media of claim 12, wherein the instructions, when executed by the one or more processors, further cause:
storing a record for each of multiple database accesses in the subset of the set of database accesses;
wherein the record identifies a particular requesting entity, a particular privilege, a particular object that was a subject of the corresponding database access, and a role to which the particular privilege is granted.

14. The one or more storage media of claim 12, wherein the instructions, when executed by the one or more processors, further cause:
for each privilege in the second subset:
identifying a particular requesting entity that is associated with said each privilege, and
identifying one or more roles to which the particular requesting entity is assigned and through which the particular requesting entity is granted said each privilege.

15. The one or more storage media of claim 12, wherein:
monitoring comprises storing privilege usage data that indicates the first subset of the set of privileges;
wherein storing the privilege usage data comprises storing at least a portion of the privilege usage data in a cursor that includes a particular execution plan.

16. The one or more storage media of claim 15, wherein storing the privilege usage data comprises:
storing a first portion of the privilege usage data in a first cursor, and
storing a second portion of the privilege usage data in a second cursor that is different than the first cursor.

17. The one or more storage media of claim 12, wherein the instructions, when executed by the one or more processors, further cause:
receiving input that indicates what information to monitor;
wherein the input identifies one or more of a set of requesting entities, the set of privileges, a set of objects, or a set of roles;
wherein monitoring comprises monitoring based on the input.

18. The one or more storage media of claim 12, wherein monitoring comprises:
determining that a first database access in the set of database accesses is initiated by a particular requesting entity and involves a first privilege;
creating a first record that includes information about the first database access;
determining that a second database access in the set of database accesses is initiated by the particular requesting entity and involves the first privilege;
based on the first record, determining not to create a second record for the second database access.

19. One or more storage media storing instructions which, when executed by one or more processors, cause:
determining that a first privilege with respect to a first database object was not utilized by a first requesting entity, wherein the first privilege includes one of select, insert, delete, or update;
determining a first grant path from the first requesting entity to the first privilege through one or more roles;
causing data about the first grant path to be displayed;
causing a role graph to be displayed, wherein the role graph includes:
a first node that represents a particular requesting entity,
one or more second nodes, each representing a role assigned directly or indirectly to the particular requesting entity;
one or more third nodes, each representing a privilege that is granted to the particular requesting entity either directly or indirectly through one or second more roles.

20. The one or more storage media of claim 19, wherein the one or more roles is a plurality of roles that includes a first role to which the first requesting entity is assigned and a second role that is different than the first role and to which is granted the first privilege with respect to the first database object.

21. The one or more storage media of claim 19, wherein the
one or more third nodes are a plurality of third nodes.

22. The one or more storage media of claim 19, wherein the role graph also includes one or more fourth nodes, each representing a requesting entity that is different than the particular requesting entity.

* * * * *